US012785887B2

(12) United States Patent
Liu et al.

(10) Patent No.: US 12,785,887 B2
(45) Date of Patent: Nov. 3, 2026

(54) METHOD AND APPARATUS OF MEASUREMENT AND REPORTING FOR BEAM DETERMINATION

(71) Applicant: Lenovo (Beijing) Limited, Beijing (CN)

(72) Inventors: Hongmei Liu, Beijing (CN); Yuantao Zhang, Beijing (CN); Zhi Yan, Beijing (CN); Ruixiang Ma, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 228 days.

(21) Appl. No.: 18/845,707

(22) PCT Filed: Mar. 11, 2022

(86) PCT No.: PCT/CN2022/080384

§ 371 (c)(1),
(2) Date: Sep. 10, 2024

(87) PCT Pub. No.: WO2023/168702

PCT Pub. Date: Sep. 14, 2023

(65) Prior Publication Data

US 2025/0192941 A1 Jun. 12, 2025

(51) Int. Cl.
*H04L 5/00* (2006.01)

(52) U.S. Cl.
CPC .......... *H04L 5/0048* (2013.01); *H04L 5/0092* (2013.01)

(58) Field of Classification Search
CPC .... H04L 5/0048; H04L 5/0092; H04L 5/0094
(Continued)

(56) References Cited

U.S. PATENT DOCUMENTS

| | | | | |
|---|---|---|---|---|
| 2019/0261345 | A1* | 8/2019 | Shi | H04W 72/046 |
| 2021/0044404 | A1* | 2/2021 | Liu | H04B 7/0697 |

(Continued)

FOREIGN PATENT DOCUMENTS

| | | | |
|---|---|---|---|
| CN | 108337075 | A | 7/2018 |
| CN | 108633068 | A | 10/2018 |
| WO | 2021118307 | A1 | 6/2021 |

OTHER PUBLICATIONS

3rd Generation Partnership Proje , "On spatial relation switching delay requirements", 3GPP TSG RAN WG4 Meeting #94-e, R4-2002088, [retrieved from the internet on Nov. 8, 2024], <https://www.3gpp.org/ftp/tsg_ran/WG4_Radio/TSGR4_94_e/Docs>, Feb. 24, 2020, 3 pages.

(Continued)

*Primary Examiner* — Marnie A Matt
(74) *Attorney, Agent, or Firm* — FIG. 1 Patents

(57) ABSTRACT

Embodiments of the present application are related to a method and apparatus of measurement and reporting for beam determination. According an embodiment of the present application, an exemplary method includes: receiving first information indicating one or more sets of reference signal (RS) from a second RAN node; receiving second information indicating at least one of a first number of first spatial domain filter for a link between the second RAN node and the RAN node, a second number of second spatial domain filter for a link between the RAN node and a third node; or a third number based on the first number and the second number; and determining at least one spatial domain filter associated with at least one RS of the one or more sets of RS at least based on the second information.

20 Claims, 10 Drawing Sheets

(58) Field of Classification Search
USPC .......................................................... 370/328
See application file for complete search history.

(56) References Cited

U.S. PATENT DOCUMENTS

| | | | |
|---|---|---|---|
| 2021/0144720 A1 | 5/2021 | Xu et al. | |
| 2021/0184812 A1* | 6/2021 | MolavianJazi ....... | H04L 1/0041 |
| 2021/0385849 A1 | 12/2021 | Matsumura et al. | |
| 2021/0392514 A1* | 12/2021 | Matsumura ........ | H04B 7/06968 |
| 2022/0353824 A1* | 11/2022 | Liu ....................... | H04L 5/0048 |

OTHER PUBLICATIONS

PCT/CN/2022/080384 , "International Search Report and Written Opinion", International Application No. PCT/CN2022/080384, Dec. 9, 2022, 6 pages.

* cited by examiner

METHOD AND APPARATUS OF MEASUREMENT AND REPORTING FOR BEAM DETERMINATION

TECHNICAL FIELD

Embodiments of the present application generally relate to wireless communication technology, especially to a method and apparatus of measurement and reporting for beam determination.

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

In legacy release, to enable transmission and/or reception in a link between a base station (BS), e.g., gNB and a user equipment (UE), the gNB will indicate the UE a downlink (DL) reception or uplink (UL) transmission beam, which may be based on measurement and reporting on reference signals (RS) s to match channel status, e.g., channel state information-reference signal (CSI-RS), synchronization signal (SS)/physical broadcast channel (PBCH) block (SSB), or sounding reference signal (SRS) etc. When there is a repeater between the gNB and the UE, for each SSB, CSI-RS and SRS, the repeater needs to determine at least one of the reception beam and transmission beam for a link between the gNB and the repeater and determine at least one of the transmission beam and reception beam for a link between the repeater and the UE, so that measurement and reporting can be performed at gNB or UE side based on the RS.

Thus, how to perform measurement and reporting to determine RSs or beam(s) of a repeater for the link between the gNB and repeater and the link between the repeater and the UE should be solved.

SUMMARY OF THE DISCLOSURE

One objective of the present application is to provide a method and apparatus of measurement and reporting for beam determination, e.g., a method and apparatus of beam determination for DL and UL RS for a link between a gNB and repeater or a link between a repeater and UE or the like.

According to some embodiments of the present application, an exemplary RAN node e.g., a repeater includes: a transceiver; and at least one processor coupled to the transceiver, wherein the at least one processor is configured to: receive, via the transceiver, first information indicating one or more sets of RS from a second RAN node; receive, via the transceiver, second information indicating at least one of the following from the second RAN node: a) a first number of first spatial domain filter for a link between the second RAN node and the RAN node, and a second number of second spatial domain filter for a link between the RAN node and a third node; b) the second number; or c) a third number based on the first number and the second number; and determine at least one spatial domain filter associated with at least one RS of the one or more sets of RS at least based on the second information, wherein the at least one spatial domain filter includes at least one of: the first spatial domain filter for the link between the second RAN node and the RAN node or the second spatial domain filter for the link between the RAN node and the third node.

Some embodiments of the present application also propose a method performed by the RAN node. An exemplary method may include: receiving first information indicating one or more sets of RS from a second RAN node; receiving second information indicating at least one of the following from the second RAN node: a) a first number of first spatial domain filter for a link between the second RAN node and the RAN node, and a second number of second spatial domain filter for a link between the RAN node and a third node; b) the second number; or c) a third number based on the first number and the second number; and determining at least one spatial domain filter associated with at least one RS of the one or more sets of RS at least based on the second information, wherein the at least one spatial domain filter includes at least one of: the first spatial domain filter for the link between the second RAN node and the RAN node or the second spatial domain filter for the link between the RAN node and the third node.

In some embodiments of the present application, the one or more sets of RS are a set of RS to be received by the RAN node and then transmitted from the RAN node to the third node, or a set of RS to be received by the RAN node and then transmitted from the RAN node to the second RAN node. The set of RS may be a set of CSI-RS, a set of SSB, or a set of sounding reference signal (SRS). Determining the at least one spatial domain filter associated with the at least one RS may include: mapping the at least one spatial domain filter with the at least one RS of the set of RS in a mapping order based on at least one of: the first number, the second number, a number of spatial domain filter for transmission in the second RAN node, or a number of RSs in the set of RS, wherein the mapping order is predefined or is configured by the second RAN node; or mapping the at least one spatial domain filter with the at least one RS of the set of RS in the mapping order based on at least one of: the third number, a number of spatial domain filter for transmission in the second RAN node, or a number of RSs in the set of RS. According to some embodiments of the present application, the mapping order is a sequence of at least one of: mapping between RSs to spatial domain filters for the link between the second RAN node and the RAN node, or mapping between RSs and spatial domain filters for the link between the RAN node and the third node. According to some other embodiments of the present application, the mapping order is a sequence of at least one of: mapping between RSs to spatial domain filters for the second RAN node, mapping between RSs to spatial domain filters for the RAN node, or mapping between RSs and spatial domain filters for the third node.

In some embodiments of the present application, the one or more sets of RS are a first set of RS and a second set of RS separately received via the first information, and the second set of RS is to be received by the RAN node and then transmitted to the third node by the RAN node. Determining the at least one spatial domain filter associated with the at least one RS may include: determining at least one first spatial domain filter associated with at least one RS of the first set of RS based on at least one of: a number of spatial domain filter for transmission in the second RAN node, or a number of RSs in the first set of RSs; and determining at least one second spatial domain filter associated with at least one RS of the second set of RS based on at least one of: the second number, or a number of RSs in the second set of RSs. Both the first set of RS and the second set of RS may be a set of CSI-RS, or a set of SSB. In the case that both the first set of RS and the second set of RS are SSB, they are configured based on different SSB indexes, or based on different SSB offsets, or based on different SSB periodicities and offsets.

In some embodiments of the present application, the one or more sets of CSI-RS are configured with parameter repetition to be off or on. The set of SRS is configured with parameter usage to be beam management.

In some embodiments of the present application, determining the at least one spatial domain filter associated with the at least one RS may include: determining at least one first spatial domain filter for the link between the RAN node and the second RAN node based on a signaling from the second RAN node indicating a spatial domain filter; and determining at least one second spatial domain filter for the link between the RAN node and the third node based on at least one of: the second number, or a number of RSs in a set of RS to be received by the RAN node and transmitted to the third node.

In some embodiments of the present application, in the case that the one or more sets of RS are one or more sets of CSI-RS, or one or more sets of SSB, the at least one processor may be configured to: transmit at least one index of the at least one RS of the one or more sets of RS and at least one of reference signal receiving power (RSRP), reference signal receiving quality (RSRQ), or received signal strength indication (RSSI) associated with the at least one RS. In the case that there are two or more sets of RS and group reporting is enabled, the at least one processor is configured to transmit two or more RS indexes together.

In some embodiments of the present application, the at least one processor is configured to transmit, at least one of the first number, the second number or the third number, to the second RAN node.

In some embodiments of the present application, the at least one processor is configured to receive a number of spatial domain filter for transmission or reception in the second RAN node.

In some embodiments of the present application, each of the first information and the second information is received via system information block (SIB), radio resource control (RRC) or media access control (MAC) control element (CE).

According to some embodiments of the present application, an exemplary RAN node e.g., a gNB includes: a transceiver; and at least one processor coupled to the transceiver, wherein the at least one processor is configured to: transmit, via the transceiver, first information indicating one or more sets of RS to a first RAN node; transmit, via the transceiver, second information indicating at least one of the following to the first RAN node: a) a first number of first spatial domain filter for a link between the RAN node and the first RAN node, and a second number of second spatial domain filter for a link between the first RAN node and a third node; b) the second number; or c) a third number based on the first number and the second number; and determine at least one spatial domain filter associated with at least one RS of the one or more sets of RS at least based on the second information, wherein the at least one spatial domain filter includes at least one of: the first spatial domain filter for the link between the RAN node and the first RAN node or the second spatial domain filter for the link between the first RAN node and the third node.

In some embodiments of the present application, the one or more sets of RS are a set of RS to be received by the first RAN node and then transmitted from the first RAN node to the third node or the one or more sets of RS are a set of RS to be received by the first RAN node and then transmitted from the first RAN node to the RAN node. Determining the at least one spatial domain filter associated with the at least one RS may include: mapping the at least one spatial domain filter with the at least one RS of the set of RS in a mapping order based on at least one of: the first number, the second number, a number of spatial domain filter for transmission in the RAN node, or a number of RSs in the set of RS, wherein the mapping order is predefined or is configured by the RAN node; or mapping the at least one spatial domain filter with the at least one RS of the set of RS in the mapping order based on at least one of: the third number, a number of spatial domain filter for transmission in the RAN node, or a number of RSs in the set of RS. According to some embodiments of the present application, the mapping order is a sequence of at least one of: mapping between RSs to spatial domain filters for the link between the RAN node and the first RAN node, or mapping between RSs and spatial domain filters for the link between the first RAN node and the third node. According to some embodiments of the present application, the mapping order is a sequence of at least one of: mapping between RSs to spatial domain filters for the RAN node, mapping between RSs to spatial domain filters for the first RAN node, or mapping between RSs and spatial domain filters for the third node.

In some embodiments of the present application, the one or more sets of RS are a first set of RS and a second set of RS separately transmitted via the first information, and the second set of RS is to be received by the first RAN node and then transmitted to the third node by the first RAN node. Determining the at least one spatial domain filter associated with the at least one RS further includes: determining at least one first spatial domain filter associated with at least one RS of the first set of RS based on at least one of: a number of spatial domain filter for transmission in the RAN node, or a number of RSs in the first set of RSs; and determining at least one second spatial domain filter associated with at least one RS of the second set of RS based on at least one of: the second number, or a number of RSs in the second set of RSs.

In some embodiments of the present application, determining the at least one spatial domain filter associated with the at least one RS may include: determining at least one first spatial domain filter for the link between the first RAN node and the RAN node based on a signaling from the RAN node indicating a spatial domain filter; and determining at least one second spatial domain filter for the link between the first RAN node and the third node based on at least one of: the second number, or a number of RSs in a set of RS to be received by the RAN node and transmitted to the third node.

In some embodiments of the present application, in the case that the one or more sets of RS are one or more sets of CSI-RS, or one or more sets of SSB, the at least one processor is configured to: receive at least one index of the at least one RS of the one or more sets of RS and at least one of RSRP, RSRQ, or RSSI associated with the at least one RS. In the case that there are two or more sets of RS and group reporting is enabled, the at least one processor is configured to receive two or more RS indexes together.

In some embodiments of the present application, the at least one processor is configured to receive, at least one of the first number, the second number or the third number, from the first RAN node.

In some embodiments of the present application, the at least one processor is configured to transmit a number of spatial domain filter for transmission or reception in the RAN node.

In some embodiments of the present application, each of the first information and the second information is transmitted via SIB, RRC, or MAC CE.

Given the above, embodiments of the present application provide a technical solution of beam determination for a RAN node, e.g., a repeater, and thus will facilitate the deployment and implementation of the NR.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3rd generation partnership project (3GPP) 5G, 3GPP LTE, and so on. It is contemplated that along with the developments of network architectures and new service scenarios, all embodiments in the present application are also applicable to similar technical problems; and moreover, the terminologies recited in the present application may change, which should not affect the principle of the present application.

Figure 1:
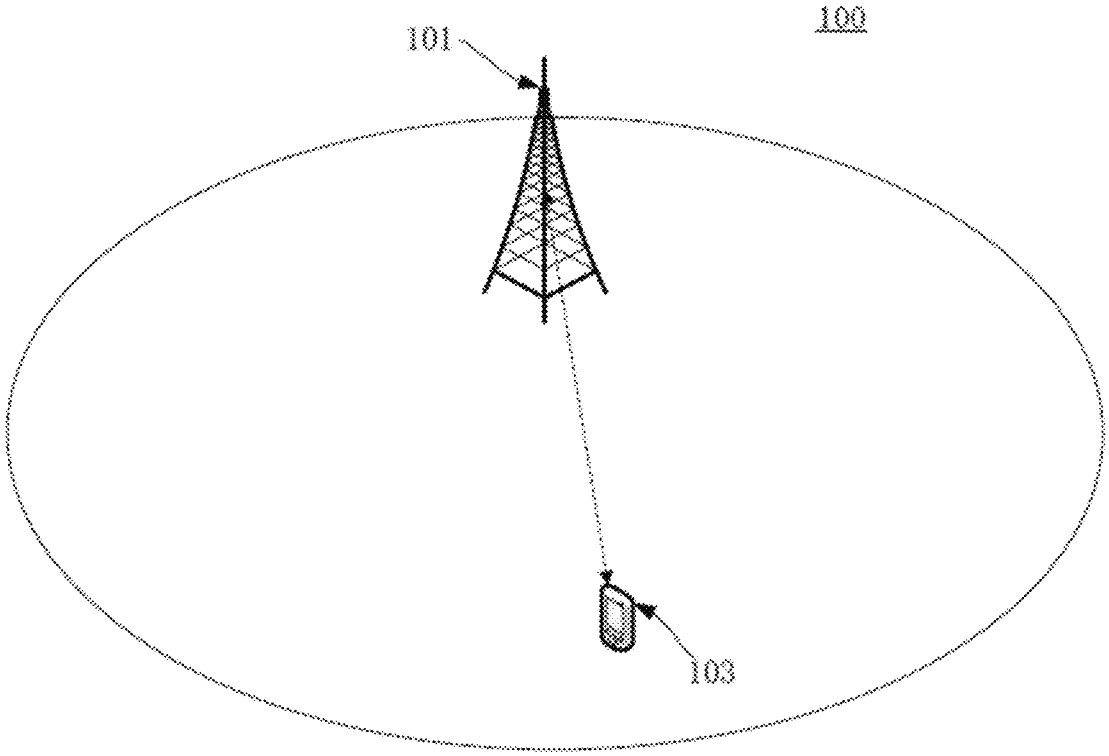
FIG. 1 is a schematic diagram illustrating an exemplary wireless communication system according to some embodiments of the present application.

FIG. 1 illustrates a schematic diagram of an exemplary wireless communication system 100 according to some embodiments of the present application.

As shown in FIG. 1, the wireless communication system 100 includes a UE 103 and a BS 101. Although merely one BS is illustrated in FIG. 1 for simplicity, it is contemplated that the wireless communication system 100 may include more BSs in some other embodiments of the present application. Similarly, although merely one UE is illustrated in FIG. 1 for simplicity, it is contemplated that the wireless communication system 100 may include more UEs in some other embodiments of the present application.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

The BS 101 may also be referred to as an access point, an access terminal, a base, a macro cell, a node-B, an enhanced node B (eNB), a gNB, a home node-B, a relay node, or a device, or described using other terminology used in the art. The BS 101 is generally part of a radio access network that may include a controller communicably coupled to the BS 101.

In addition, a BS 101 may be configured with one TRP (or panel), i.e., in a single-TRP scenario or more TRPs (or panels), i.e., a multi-TRP scenario. That is, one or more TRPs are associated with the BS 101. A TRP can act like a small BS. Two TRPs can have the same cell ID (identity or index) or different cell IDs. Two TRPs can communicate with each other by a backhaul link. Such a backhaul link may be an ideal backhaul link or a non-ideal backhaul link. Latency of the ideal backhaul link may be deemed as zero, and latency of the non-ideal backhaul link may be tens of milliseconds and much larger, e.g. on the order of tens of milliseconds, than that of the ideal backhaul link.

A single TRP can be used to serve one or more UE 103 under the control of a BS 101. In different scenarios, a TRP may be referred to as different terms, which may be represented by a TCI state index or CORESETPoolIndex value etc. It should be understood that the TRP(s) (or panel(s)) configured for the BS 101 may be transparent to a UE 103.

The UE 103 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present application, the UE 103 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 103 may include wearable devices, such as smart watches, fitness bands, optical head-mounted displays, or the like. Moreover, the UE 103 may be referred to as a subscriber unit, a mobile, a mobile station, a user, a terminal, a mobile terminal, a wireless terminal, a fixed terminal, a subscriber station, a user terminal, or a device, or described using other terminology used in the art.

To enhance the coverage area of a BS, relay nodes, such as repeaters may be deployed in a wireless communication system, which can improve the throughput of a mobile device in low signal quality, e.g., a UE that locates in a coverage hole or far from the BS.

Figure 2:
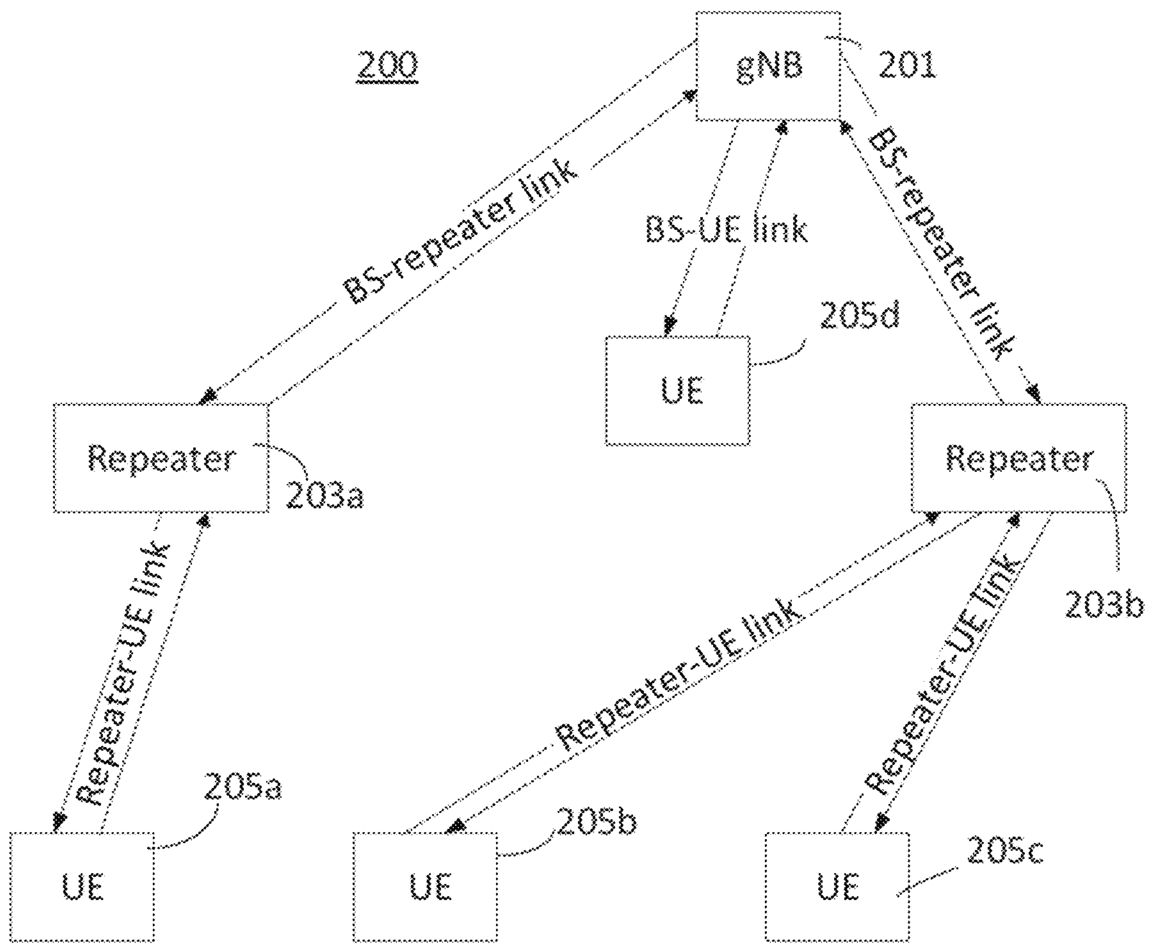
FIG. 2 illustrates a schematic diagram of an exemplary wireless communication system in a non-multi-TRP scenario according to some embodiments of the present application.
Figure 3:
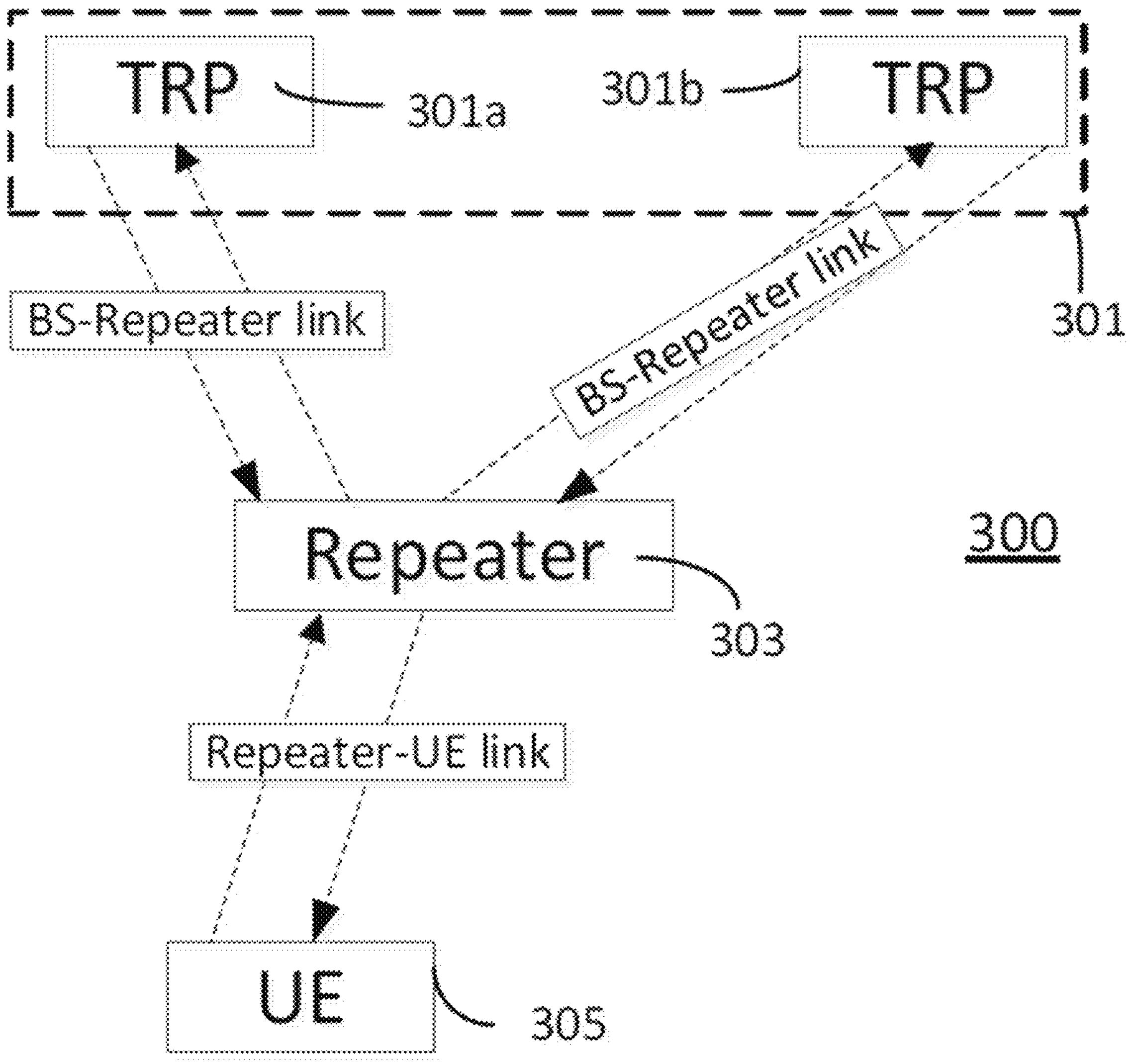
FIG. 3 illustrates a schematic diagram of an exemplary wireless communication system in a multi-TRP scenario according to some other embodiments of the present application.

FIG. 2 and FIG. 3 respectively illustrate an exemplary scenario of a wireless communication system with repeaters, wherein FIG. 2 illustrates a schematic diagram of an exemplary wireless communication system 200 in a non-multi-TRP scenario according to some embodiments of the present application, and FIG. 3 illustrates a schematic diagram of an exemplary wireless communication system 300 in a multi-TRP scenario according to some other embodiments of the present application.

Referring to FIG. 2, in the exemplary wireless communication system 200, there are multiple nodes, e.g., a gNB 201, a first repeater 203*a*, a second repeater 203*b*, a first UE 205*a*, a second UE 205*b*, a third UE 205*c* and a fourth UE 205*d*. The gNB 201 may be configured with a single TRP or not. The first repeater 203*a* is connected with the gNB 201 and the first UE 205*a*, the second repeater 203*b* is connected with the gNB 201 and the second UE 205*b* and the third UE 205*c*. A link between a BS, e.g., the gNB 201 and a repeater, e.g., the first repeater 203*a* or the second repeater 203*b* can be referred to a BS-repeater link (or gNB-repeater link), a link between a repeater, e.g., the first repeater 203*a* and a UE, e.g., the first UE 205*a* can be referred to a repeater-UE link; and a link between a BS, e.g., the gNB 201 and a UE, e.g., the fourth UE 205*d* can be referred to as a BS-UE link (or gNB-UE link).

Persons skilled in the art should well know that each BS, e.g., the gNB 201 can connect with one or more repeaters, e.g., the first repeater 203*a* and second repeater 203*b*, and one or more UEs, e.g., the first UE 205*a*, the second UE 205*b*, the third UE 205*c* and the fourth UE 205*d*; and each repeater, e.g., the first repeater 203*a* and the second repeater 203*b* can connect with one or more BSs and one or more UEs. Thus, the exemplary nodes in the wireless communication system 200 with a limited number should not be deemed as the limitation to the present application.

Referring to FIG. 3, in the exemplary wireless communication system 300, there are multiple nodes, e.g., a gNB 301, a repeater 303 and a UE 305, wherein the gNB 301 is configured with (or associated with) two TRPs, e.g., a first TRP 301*a* and a second TRP 301*b*. The repeater 303 is connected with each of the first TRP 301*a* and the second TRP 301*b*. Thus, there two links between the gNB 301 and the repeater 303, one is a BS-repeater link (or gNB-repeater link, or TRP-repeater link) between the first TRP 301*a* and the repeater 303 and the other is a BS-repeater link (or gNB-repeater link, or TRP-repeater link) between the second TRP 301*b* and the repeater 303.

According to RP-213592, smart repeaters, which are transparent to UEs will be studied and identified. The smart repeaters can maintain the BS-repeater link and repeater-UE link simultaneously, and thus side control information including beamforming information is necessary for smart repeaters including assumption of max transmission power.

Figure 4:
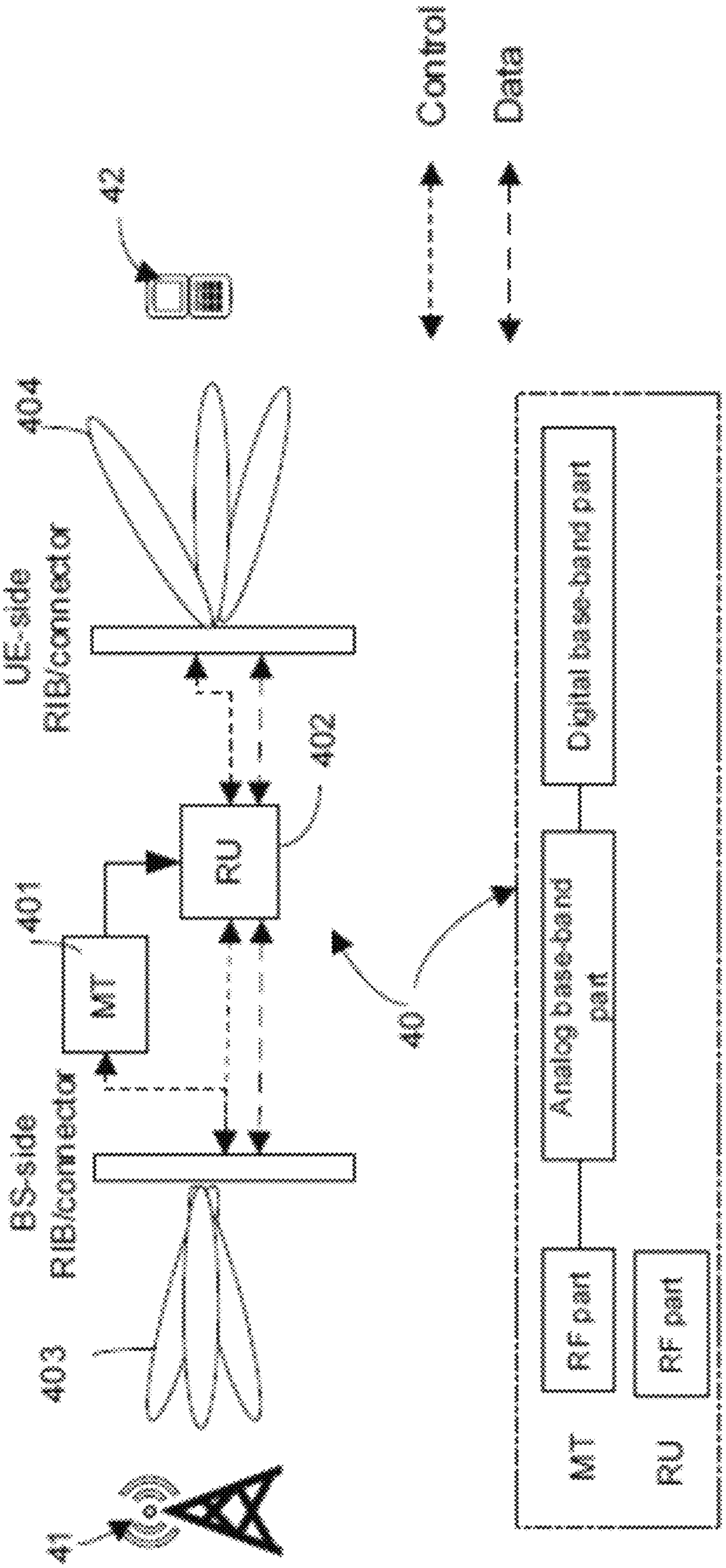
FIG. 4 illustrates a schematic diagram of an exemplary wireless communication system according to some embodiments of the present application.

FIG. 4 illustrates a schematic diagram of an exemplary wireless communication system 400 according to some embodiments of the present application, wherein the structure of an exemplary smarter repeater 40 is shown.

As shown in FIG. 4, the exemplary repeater 40 mainly includes a mobile termination (MT) 401 and a radio frequency (RF) unit (RU) 402. The MT 401 includes a RF part, an analog-based-band part coupled to the RF part and a digital base-band part coupled to the analog base-band part. The MT 401 can receive side control information from a gNB 41 or transmit information to gNB 41, while there is no connection between the MT 401 and the UE 42. The RU 402 includes a RF part, which can receive and transmit data and control information between the gNB 41 and the repeater 40 and between the repeater 40 and the UE 42. The RU 402 can also forward DL signal and/or RS from the gNB 41 to the UE 42 or forward UL signal and/or RS from the UE 42 to the gNB 41.

In addition, the repeater 40 has at least one beam 403 for a link between the gNB 41 and repeater 40 and at least one beam 404 for a link between the repeater 40 and the UE 42. Each of beams 403 and 404 can be used for at least one of reception and transmission. For example, the RU 402 can receive DL signals from the gNB 41 via the beam 403 and transmit the DL signals to the UE 42 via the beam 404 simultaneously (not considering the beam switching time etc.), and the RU 402 can also receive UL signals from the UE 42 via the beam 404 and transmit the UL signals to the gNB 41 via the beam 403 simultaneously (not considering the beam switching time etc.).

The gNB 41 can configure beam(s) for the repeater 40 and UE 42. To match channel status for the gNB-repeater link and repeater-UE link, measurement and/or reporting on RSs, e.g., SSB, CSI-RS or SRS needs to be performed to determine the beam for DL signals and UL signals for gNB-repeater link and repeater-UE link.

However, in legacy technology, a gNB indicates to a UE a DL reception beam and/or UL transmission beam for communication between the gNB and the UE. When there is a legacy repeater, which is not smart, between the gNB and the UE, the repeater needs to determine at least one of the reception beam and transmission beam for the BS-repeater link for each DL reception and UL transmission (e.g., for each DL or UL channel, or for each DL or UL RS in the BS-repeater link) and at least one of the transmission beam and reception beam for the repeater-UE link for each DL transmission and UL reception (e.g., for each DL or UL channel, or for each DL or UL RS in the repeater-UE link). That is, no side control information on beamforming is required by the legacy repeater. Thus, the industry needs a technical solution for solving the side control information, e.g., beamforming information to the smart repeaters or the like.

Moreover, in an IAB network or the like, the restricted or recommended beam for a child link may be associated with a RS or beam for a parent link per RAN1agreement.

However, that is different from the technical problem and technical solution discussed for smart repeaters in the present application. For smart repeaters, how to derive beam(s) for a BS-repeater link (similar to a parent link) and a repeater-UE link (similar to a child link) can be based on separate or joint indication of beam for BS-repeater link and repeater-UE link. It can be based on at least one RS index reported by UE. There is no restriction between beams for the BS-repeater link and repeater-UE link, should be solved. Accordingly, the one or more sets of RS hereafter refer to the RSs for measurement and/or reporting of channel status or the like for DL or UL beam determination.

At least to solve the above technical problem, embodiments of the present application propose a technical solution of measurement and/or reporting for beam determination, e.g., a method and apparatus of measurement and/or reporting for beam determination, so that a RAN node, e.g., a smart repeater can determine beam(s) for transmission and/or reception in the BS-repeater link(s) and beam(s) for transmission and/or reception in the repeater-UE link(s).

Figure 5:
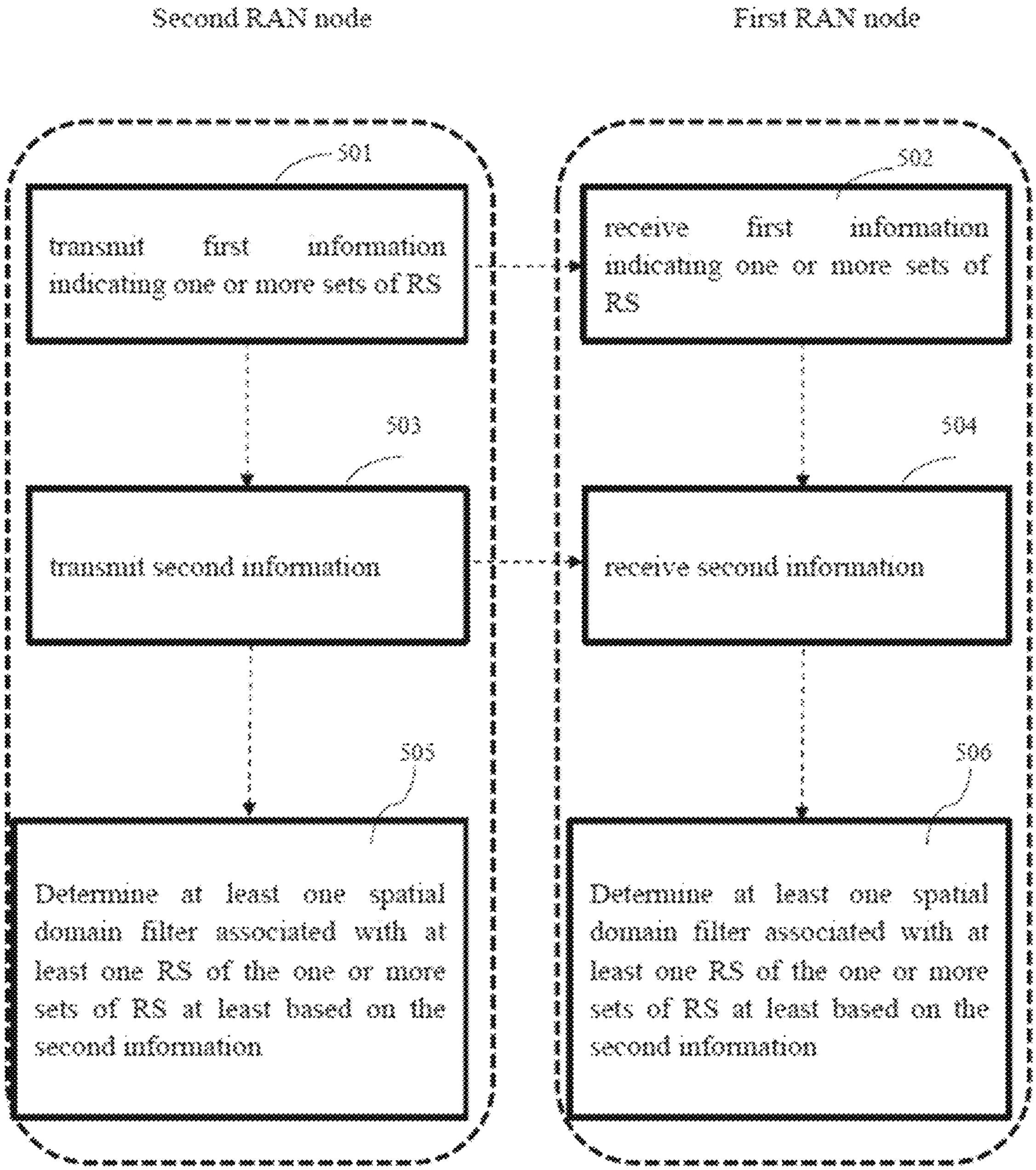
FIG. 5 is a flow chart illustrating an exemplary procedure of a method of measurement and reporting for beam determination according to some embodiments of the present application.

FIG. 5 is a flow chart illustrating an exemplary procedure of a method of measurement and reporting for beam determination according to some embodiments of the present application. Although the method is illustrated in a system level by a first RAN node, e.g., a repeater and a second RAN node, e.g., a BS, persons skilled in the art should understand that the method implemented in the two RAN nodes can be separately implemented and/or incorporated by other apparatus with the like functions.

As shown in FIG. 5, the first RAN node, e.g., a repeater is deployed between a second RAN node, e.g., a gNB and a third node, e.g., a UE, and may maintain at least one link between the first RAN node and the second RAN node, e.g., at least one BS-repeater link and at least one link between the first RAN node and the third node, e.g., at least one repeater-UE link simultaneously. The second RAN node will provide necessary side control information, e.g., beamforming information to the first RAN node. For example, the gNB may configure one or more RSs e.g., SSB, CSI-RS or SRS for measurement and/or reporting to determine beam(s) of the repeater for at least one of DL and UL signals, so that channel status for at least one of the gNB-repeater link and repeater-UE link can be matched. The at least one of measurement and reporting can be performed for the gNB-repeater link and repeater-UE link separately or jointly.

Persons skilled in the art should well know that herein (throughout the specification), the wordings, such as the first, the second, and the third etc., are only used to distinguish similar features or elements etc., for clearness, and should not be deemed as limitation to the scope of the technical solutions. In addition, each beam for a RAN node or a node, e.g., a UE is associated with a spatial domain filter for transmission or reception (i.e., a spatial domain transmission or reception filter), which is also associated with at least one RS. For example, each beam or spatial domain filter is associated with at least one of: CSI-RS, or SSB, or SRS, or TCI state, or joint TCI state, or spatial relation information etc. Each TCI state, or spatial relation information, or joint TCI state for at least one of downlink and uplink may be associated with one or two quasi co-located (QCL)-typeD RSs.

According to some embodiments of the present application, in step 501, the second RAN node may transmit first information to the first RAN node, indicating one or more sets of RS. Herein, the wording "a set of" or the like means "one or more," or "at least one," or the like. The one or more sets of RS indicated in the first information can be transmitted via one or more signals, e.g., at least one of SIB, RRC or MAC CE etc. Accordingly, in the first RAN node, the first information will be received in step 502.

Regarding the one or more sets of RS, the first RAN node may further transmit all the received one or more sets of RS, i.e., forwarding the received one or more sets of RS to the third node e.g., a UE in some embodiments of the present application. The third node will measure the received one or more sets of RS and report the channel status accordingly to the gNB via the repeater. That is, the measurement and/or reporting is performed jointly by the third node. For example, the one or more sets of RS are a set of RS to be received by the first RAN node and then transmitted from the first RAN node to the third node, that is, the first RAN node will forward the received set of RS to the third node. Such an exemplary set of RS is a set of CSI-RS or a set of SSB. The set of CSI-RS can be configured with parameter repetition to be off or on. This may be applicable for DL channel and/or RS. For another example, the one or more sets of RS are a set of RS to be received by the first RAN node and then transmitted from the first RAN node to the second RAN node, that is, the first RAN node will forward the received set of RS to the second RAN node. This may be applicable to UL channel and/or RS. Such an exemplary set of RS is a set of SRS. The set of SRS can be configured with parameter usage to be beam management.

In some other embodiments of the present application, the first RAN node may transmit only a part of the received one or more sets of RS, i.e., forwarding a part of the received one or more sets of RS to other node(s). For example, the one or more sets of RS may include a first set of RS and a second set of RS, wherein the second set of RS is to be received by the first RAN node and then transmitted to the third node by the first RAN node. The first set of RS will not be forwarded. The first RAN node will perform measurement based on the first set of RS and report the measurement accordingly, e.g., an index of at least one best RS of the first RS set associated with a beam for the BS-repeater link. The reporting metric may also contain RSRP, RSRQ, or RSSI of the corresponding RS index. The third node will measure the second set of RS and report the measurement result accordingly, e.g., an index of the at least one best RS of the second RS set associated with a beam for the repeater-UE link. The reporting metric may also contain RSRP, RSRQ or RSSI of the corresponding RS index. That is, the measurement and/or reporting for BS-repeater link and repeater-UE link is performed separately by the first RAN node and third node. Such an exemplary first or second set of RS is a set of CSI-RS. The set of CSI-RS can be configured with parameter repetition to be off or on. Such another exemplary first or second set of RS is a set of SSB. In the case that both the first set of RS and the second set of RS are SSB, they can be configured based on different SSB indexes, or based on different SSB offsets, or based on different SSB periodicities and offsets.

The first RAN node may transmit the index of the RS(s) to be reported and the associated measurement result, e.g., RSRP, RSRQ, or RSSI etc., to the second RAN node. For the RS(s) measured and reported by the third node, the reported information will be transmitted to the first RAN node from the third node and then transmitted to the second RAN node by the first RAN node. For example, in the case that at least one SSB or CSI-RS to be reported, the first RAN node may transmit the index of the at least one RS and RSRP, RSRQ, or RSSI associated with the at least one RS. When there are two or more sets of RS and group reporting is enabled, the first RAN node will transmit the RS indexes of two or more RSs together. The first RAN node may also transmit the RSRP, RSRQ or RSSI associated with the two or more RSs.

According to some embodiments of the present application, in step 503, the second RAN node may transmit second information to the first RAN node. The second information may indicate at least one of the following: a) the first number of first spatial domain filter, e.g., M for a link between the second RAN node and the RAN node, and the second number of second spatial domain filter, e.g., N for a link between the RAN node and a third node; b) the second number, e.g., N; or c) the third number or value based on the first number and the second number, e.g., M*N. Similarly, the second information can be transmitted via one or more signals, e.g., at least one of SIB, RRC or MAC CE etc. Accordingly, the first RAN node will receive the second information in step 504.

In some embodiments of the present application, the first RAN node may report beam number information to the second RAN node. For example, the first RAN node can report at least one of the number of first spatial domain filter, e.g., m for a link between the second RAN node and the first RAN node, the number of second spatial domain filter, e.g., n for a link between the first RAN node and the third node, and a number based on the first and second spatial domain filters, e.g., m*n. The second RAN node can make proper beam configuration or RS configuration based on the beam number information reported by the first RAN node. For example, the first number, the second number and the third number can be configured to be identical with the reported number, e.g., M=m, N=n, or M*N=m*n etc. The number of RS in each set of RS can also be well configured based on the associated beam number. The transmission or reception beam of the second node may also be indicated to the repeater.

The second RAN node will determine at least one spatial domain filter associated with at least one RS of the one or more sets of RS at least based on the second information in step 505. Similarly, the first RAN node will determine at least one spatial domain filter associated with at least one RS of the one or more sets of RS at least based on the second information in step 506. The at least one spatial domain filter includes at least one of: the first spatial domain filter for the link between the second RAN node and the RAN node or the second spatial domain filter for the link between the RAN node and the third node. Persons skilled in the art should understand that although the method is illustrated in the sequence of steps, which is only for clearness and should not be deemed sequence limitation. For example, there is no sequence limitation among steps 501, 503 and 505 performed in the second RAN node.

Considering the measurement and/or reporting of channel status may be performed jointly or separately by the first RAN node and the third node, the beam(s) associated with RSs can be determined in different manners. Hereafter, taking a repeater as an example of the first RAN node, taking a gNB as an example of the second RAN node, and taking a UE as an example of the remote apparatus, more details on how to configure and indicate the first and second information to the first RAN node by the second RAN node and how the first RAN node determines the related beam(s) etc., will be illustrated below in view of various exemplary embodiments of the present application. Persons skilled in the art should well know that the illustrated solutions can also be applied to other nodes with the like functions in a wireless communication system.

Scheme 1

In some embodiments of the present application, measurement and/or reporting of channel status is performed jointly to keep transparent to UE. With QCL-typeD RS indication (or beam indication or the like) from the gNB to UE, UE will also know its corresponding reception beam or transmission beam.

According to some embodiments of the present application, determining the at least one spatial domain filter associated with the at least one RS by the repeater or gNB or even UE may include: mapping the at least one spatial domain filter with the at least one RS of the set of RS in a mapping order based on at least one of: the first number, the second number, a number of spatial domain filter for transmission in the gNB, or a number of RSs in the set of RS. According to some embodiments of the present application, determining the at least one spatial domain filter associated with the at least one RS in the repeater or gNB may include: mapping the at least one spatial domain filter with the at least one RS of the set of RS in a mapping order based on at least one of: the third number, a number of spatial domain filter for transmission in the gNB, or a number of RSs in the set of RS. The mapping order is predefined or is configured by the gNB. For example, mapping between RSs to spatial domain filters for the BS-repeater link, or mapping between RSs and spatial domain filters for the repeater-UE link, or mapping between the RSs to spatial domain filters for the BS-repeater link and for the repeater-UE link, or mapping between RSs to spatial domain filters for the gNB, or mapping between RSs to spatial domain filters for the repeater, or mapping between RSs and spatial domain filters for the UE. An exemplary mapping order is a sequence of: firstly mapping between RSs to gNB spatial domain transmission filters for the BS-repeater link, and secondly mapping between RSs to repeater spatial domain reception transmission filters for the BS-repeater link, and thirdly mapping between RSs and repeater spatial domain transmission filters for the repeater-UE link, and fourthly mapping between RSs and UE spatial domain reception filters for the repeater-UE link. Another exemplary mapping order is a sequence of at least one of: firstly mapping between RSs to spatial domain transmission filters for the gNB, mapping between RSs to spatial domain transmission and reception filters for the repeater, or mapping between RSs and spatial domain reception filters for the UE. Yet another exemplary mapping order is a sequence of: firstly mapping between RSs to gNB spatial domain reception filters for the BS-repeater link, and secondly mapping between RSs to repeater spatial domain reception transmission filters for the BS-repeater link, and thirdly mapping between RSs and repeater spatial domain transmission filters for the repeater-UE link, and fourthly mapping between RSs and UE spatial domain transmission filters for the repeater-UE link. Yet another exemplary mapping order is a sequence of at least one of: firstly mapping between RSs to spatial domain reception filters for the gNB, mapping between RSs to spatial domain transmission and reception filters for the repeater, or mapping between RSs and spatial domain transmission filters for the UE.

Regarding beam determination for DL, the gNB will configure and transmit a set of DL RS, e.g., a set of CSI-RS or a set of SSB via first information, which is to be received by the repeater and then transmitted from the repeater to the UE. For UL, the gNB will configure a set of UL RS, e.g., a set of SRS to be transmitted by UE, which is to be received by the repeater and then transmitted from the repeater to the gNB. Accordingly, RS configuration information to the repeater will be enhanced over the legacy technology. For example, for DL, the gNB will indicate which RS (or resource) is for gNB transmission beam sweeping, which resource is for repeater reception beam sweeping (that is, all repeater reception beams will be measured), which resource is for repeater transmission beam sweeping (that is, all repeater transmission beams will be measured), and which resource is for UE reception beam sweeping ((that is, all UE reception beams will be measured). Beam sweeping is to transmit different RSs with different beam directions. Each beam direction will be associated with a RS at different time and/or frequency resources, so that channel status at each beam direction can be determined based on measurement and reporting. This can be considered that all beam directions of a node are swept. The gNB can indicate such information to the repeater via the second information.

For example, for DL, the gNB may indicate the number of repeater reception beams (i.e., the first number, M), and the number of repeater transmission beams (i.e., the second number, N). In another example, for DL, the gNB may indicate a multiplication of N and M, i.e., (N*M), and the reception and/or transmission beam sweeping is left to the repeater implementation. These numbers or values can be configured based on the associated beam number information reported by the repeater, being identical with the reported number or different from the reported number. For DL, the gNB may also indicate the number of transmission beams at gNB side. The number of RS in the RS set will also be known by the repeater. It can be by explicit configuration or by implicit determination from the size of the RS set.

Figure 6:
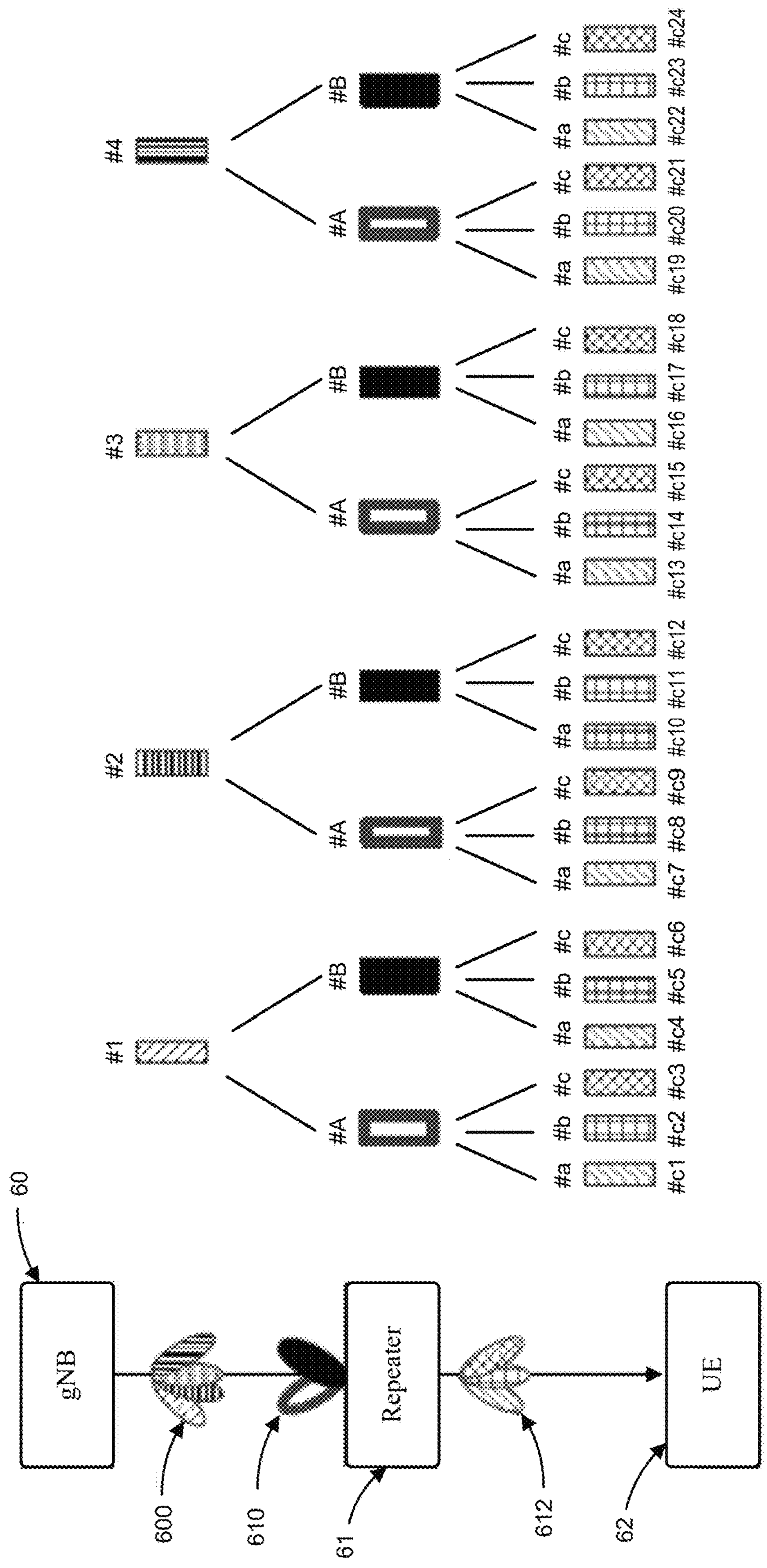
FIG. 6 illustrates a schematic diagram of a scenario where a method of measurement and reporting for beam determination under Scheme 1 is applied for DL according to some embodiments of the present application.

Taking CSI-RS as an example for DL, FIG. 6 illustrates a schematic diagram of a scenario where a method of measurement and reporting for beam determination under Scheme 1 is applied for DL according to some embodiments of the present application.

As shown in FIG. 6, there is a CSI-RS set, e.g., a non-zero production (NZP) CSI-RS set with 24 CSI-RS resources, e.g., #c1-#c24, which will be transmitted by the gNB 60, received by the repeater 61, forwarded by the repeater 61, and received by the UE 62. The gNB 60 will indicate the number of CSI-RS in the CSI-RS set to the repeater 61. For beam management based on CSI-RS on the UE 62, UE measurement and reporting will be kept same as in legacy technology. For example, the UE 62 is configured to report at least one CSI-RS resource indicator (CRI) and the corresponding L1-RSRP.

The gNB 60 has four transmission beams 600, e.g., #1-#4 for the BS-repeater link, and the number of the transmission beams 600 will be indicated to the repeater 61. The gNB 60 may also indicate to the repeater 61: two reception beams 610, e.g., #A and #B for the BS-repeater link and three transmission beams 612, e.g., #a, #b and #c for the repeater-UE link. Assuming that the mapping order is firstly repeater transmission beams, then repeater reception beams, and finally gNB transmission beams. Mapping the transmission beam 600 of the gNB 60 to RSs will be based on most significant bit (MSB), and mapping the reception and transmission beams of the repeater 61 to RSs will be based on least significant bit (LSB). Accordingly, for the 24 CSI-RS resources, every 6 CSI-RS resources are mapped to a corresponding one of transmission beam #1-#4 of the gNB 60. Every 3 CSI-RS resources will be further mapped to a corresponding one of the two reception beams of the repeater 61, and then each CSI-RS will be mapped to the a corresponding one of the three transmission beams of the repeater 61.

Based on the mapping, when there is a CRI reporting from the UE 62, the gNB 60 will know at least one of the corresponding gNB transmission beam, repeater reception beam and repeater transmission beam or UE reception beam. If the CRI is indicated from the gNB 60 to the repeater 61, then the repeater 61 will also know at least one of the corresponding gNB transmission beam, the corresponding repeater reception beam and repeater transmission beam, the corresponding UE reception beam. For example, if a CSI-RS index #c16 is reported from the UE 62 to the gNB 60, then it will corresponds to the gNB transmission beam #3, the repeater reception beam #B, and repeater transmission beam #a. Accordingly, if a CSI-RS index #c16 is indicated from the gNB 60 to the repeater 61, then it will correspond to the gNB transmission beam #3, the repeater reception beam #B, and repeater transmission beam #a.

When the DL RS is SSB, it can be treated similarly as CSI-RS. A small difference may be that the number of beams of the repeater may be configured in different signals, e.g., using SIB in the case of SSB, while using RRC or MAC CE in the case of CSI-RS.

Regarding beam determination for UL, it is similar to that for DL. A set of UL RS will be transmitted by the UE, received and forwarded by the repeater, and then received by the gNB. For UE, periodic SRS transmission will be configured as the legacy technology.

Figure 7:
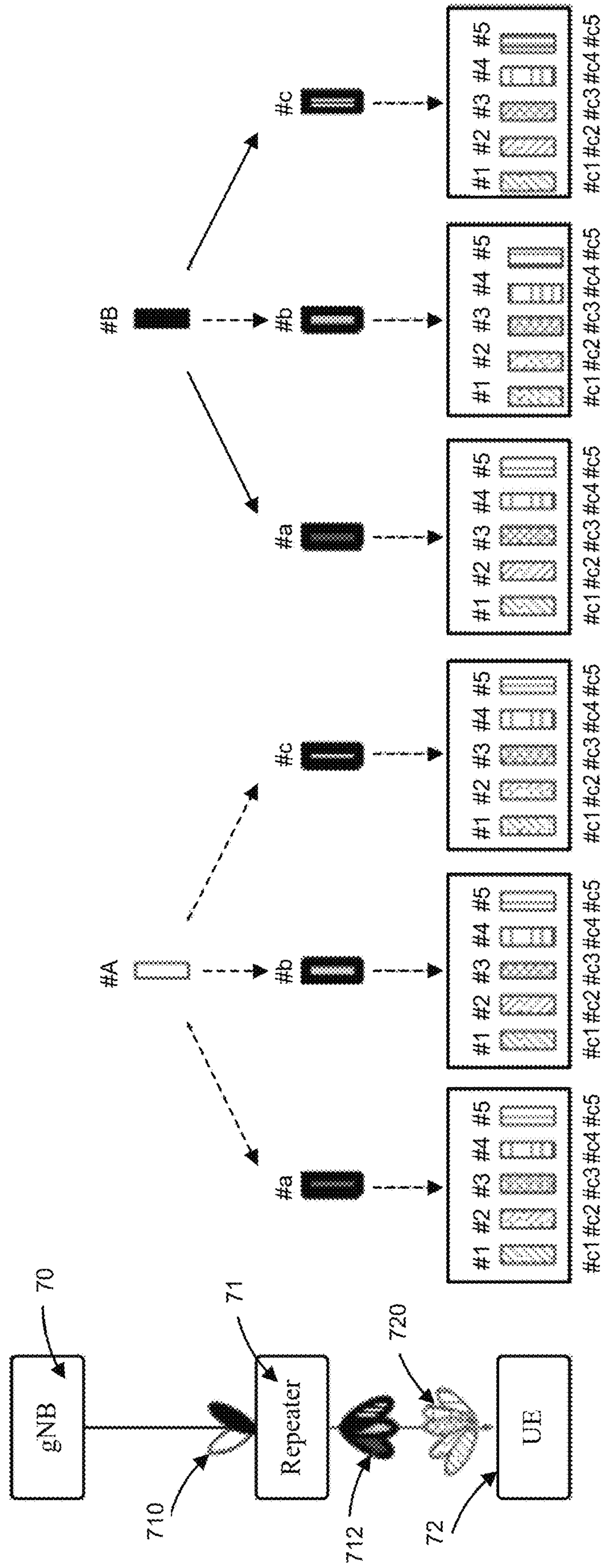
FIG. 7 illustrates a schematic diagram of a scenario where a method of measurement and reporting for beam determination under Scheme 1 is applied for UL according to some embodiments of the present application.

Taking SRS as an example, FIG. 7 illustrates a schematic diagram of a scenario where a method of measurement and reporting for beam determination under Scheme 1 is applied for UL according to some embodiments of the present application.

As shown in FIG. 7, the repeater 71 has two transmission beams 710, e.g., #A and #B for the BS-repeater link and three reception beams 712, e.g., #a, #b and #c for the repeater-UE link, and the UE 72 has five transmission beams 720, e.g., #1-#5 for the repeater-UE link. A SRS resource set with 5 SRS resources, e.g., #s1-#s5 can be configured by the gNB 70, and the UE 72 can be configured to use different transmission beams for different SRS resources in the set.

The repeater 71 may report its beam number information to the gNB 70, so that the gNB 70 can make proper configuration. For example, the gNB 70 may indicate to the repeater 71 the beam number of the repeater 71, which can include the number of repeater reception beams for the repeater-UE link, e.g., N=3, and the number of repeater transmission beams for the gNB-repeater link, e.g., M=2. The gNB 70 may also indicate the multiplication of the number of repeater reception beams and number of repeater transmission beams, e.g., 6=2*3. The gNB 70 may also indicate the number of SRS resources in a SRS resource set to the repeater 71. In some other embodiments of the present application, the number of SRS resources may also be derived by legacy SRS resource set configuration to UE if the repeater is able to receive the corresponding RRC configuration.

The gNB 70 may indicate to the repeater 71 the mapping between SRS resources in the same or different SRS resource sets and the UE transmission beam 720 and the repeater reception beam 712 for repeater-UE link and repeater transmission beam 710 for the BS-repeater link. In some other embodiments of the present application, the repeater reception beam 712 for repeater-UE link and repeater transmission beam 710 for the BS-repeater link can be treated together, and the sequence of mapping the repeater reception beam 712 and transmission beam 710 is up to repeater implementation. As an example, the mapping order between SRS resource and beam is UE transmission beam first. And then there will be mapping between different SRS resource sets and repeater reception and/or transmission beams. The mapping between different SRS resources and repeater reception and/or transmission beams can be repeater reception beam first, and followed by repeater transmission beams. Each SRS will be mapped to a UE transmission beam 720, and each SRS resource set containing 5 periodic SRS resources will be firstly mapped to a repeater reception beam 712, and then mapped to a repeater transmission beam 710. Accordingly, there will be 6 SRS resource sets, and each SRS resource set contains 5 SRS resources for sweeping all the repeater reception beams 712 for the repeater-UE link and repeater transmission beams 710 and the UE transmission beams.

Scheme 2

In some embodiments of the present application, measurement and/or reporting of channel status is performed separately. For example, there are two sets of RS, e.g., a first set of RS and a second set of RS separately received via the first information, wherein the second set of RS is to be received by the repeater and then transmitted to the UE by the repeater. The first set will not be forwarded by the repeater. Both the first set of RS and the second set of RS may be CSI-RS or SSB. In addition to reporting from the repeater to the gNB, RS measurement configuration will consider both gNB-repeater link and repeater-UE link. Thus, determining the at least one spatial domain filter associated with the at least one RS may include: determining at least one first spatial domain filter associated with at least one RS of the first set of RS and determining at least one first spatial domain filter associated with at least one RS of the second set of RS. For example, a first DL signal will be transmitted by the gNB to the repeater, and received, measured, and reported by the repeater to determine a first DL transmission beam (e.g., the best DL transmission beam) for the BS-repeater link; and a second DL signal will be transmitted from the gNB and forwarded by the repeater, and then received, measured and reported by the UE. With the UE reported RS index, the gNB can determine the QCL-typeD RS for the repeater-UE link. In some embodiments of the present application, determining at least one first spatial domain filter associated with at least one RS of the first set of RS and determining at least one first spatial domain filter associated with at least one RS of the second set of RS can be performed in an order, e.g., first determining at least one first spatial domain filter associated with at least one RS of the first set of RS (step 1), and then determining at least one first spatial domain filter associated with at least one RS of the second set of RS based on the result of step 1 (step 2).

Similar to Scheme 1, the second information will also be indicated to the repeater, e.g., the first number of transmission beam of the gNB for the BS-repeater link, and the second number of transmission beam of the repeater for the repeater-UE link etc., which can be configured based on the beam number information reported by the repeater. The number of RS in the first set of RS and the second set of RS will also be indicated to the repeater, which can be well configured based on the first and second number respectively in some embodiments of the present application.

Taking CSI-RS as an example, two CSI-RS sets may be configured to the repeater respectively. One of the two CSI-RS sets (i.e., the first CSI-RS set) is configured to be associated with a reporting of the repeater, so forwarding is not necessary. The reporting can be at least one RS index and its corresponding L1-RSRP, or L1-RSRQ etc. The other CSI-RS set (i.e., the second CSI-RS set) is configured with a DL beam of gNB-repeater link for repeater reception on the BS-repeater link, and a value corresponding to the repeater transmission beam number for the repeater-UE link will also be configured. The reason is that the second CSI-RS set is transmitted from gNB, forwarded by repeater and received by UE. So the DL beam for gNB-repeater link will be determined, and the number of transmission beams at repeater side for repeater-UE link will also be determined.

Taking SSB as an example, two SSB sets to respectively determine beam(s) for the BS-repeater link and the repeater-UE link can be based on different SSB indexes, or different SSB periodicities and offsets, or different SSB offsets.

In the case of being configured based on different SSB indexes, one set of SSB indicated by indexes is configured from the gNB to the repeater, and the repeater will report at least one SSB index and its corresponding RSRP or RSRQ. If group reporting is enabled, two or more SSB indexes will be reported together and the two or more SSB can be received simultaneously by the repeater. That is also adaptable for CSI-RS. The other set of SSB indicated by different indexes is configured to the UE. The repeater will forward these SSB and the UE will perform measurement and/or reporting on these SSB. For example, the total SSB indexes are 0-19 for a cell, wherein index 0-8 may be configured for the BS-repeater link, and index 10-19 may be configured for the repeater-UE link.

In the case of being configured based on different SSB periodicities and offsets or based on different SSB offsets, the SSB sets for different links have different periodicities and offsets or have different SSB offsets, so that they can be separated at different time instances. There is no restriction on SSB index configuration for the BS-repeater link and repeater-UE link, which can be the same or different. For example, SSB periodicity of 40 ms and offset of 10 ms are configured for the BS-repeater link, and SSB periodicity of 20 ms and offset of 0 ms are configured for the repeater-UE link. Then the SSB for the BS-repeater link will be transmitted at time instance 10 ms-14 ms, 50 ms-55 ms, etc., and the SSB for the repeater-UE link will be transmitted at time instance 0-4 ms, 20-24 ms, etc.

Since there is no processing capability at the repeater for UL signal or RS transmitted from UE, Scheme 2 can only work for DL measurement and/or reporting. That is, Scheme 2 cannot work for UL channel sounding in the case of the repeater lacking the processing capability for UL signal or RS transmitted from UE.

Figure 8:
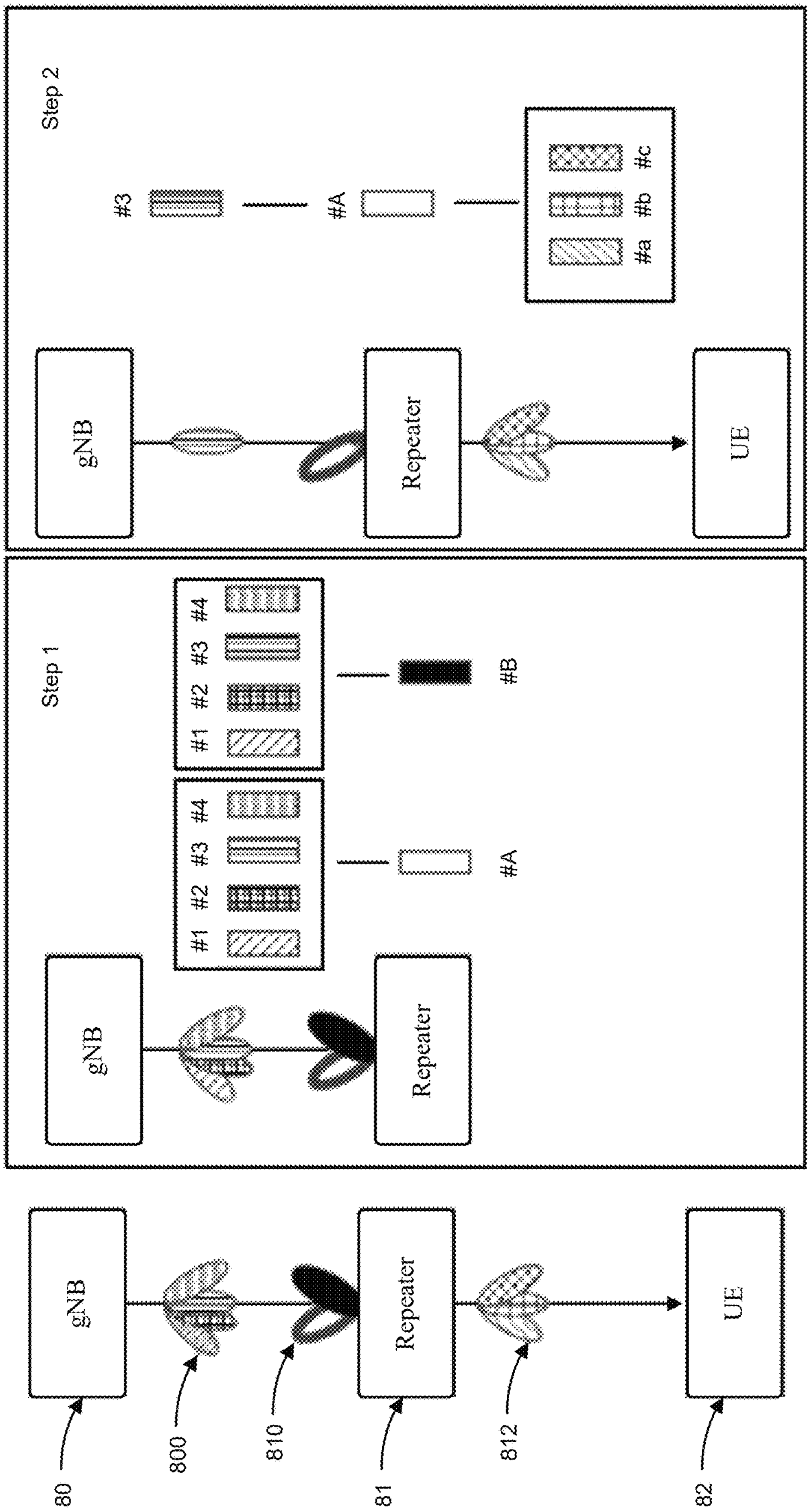
FIG. 8 illustrates a schematic diagram of a scenario where a method of measurement and reporting for beam determination under Scheme 2 is applied according to some embodiments of the present application.

FIG. 8 illustrates a schematic diagram of a scenario where a method of measurement and reporting for beam determination under Scheme 2 is applied according to some embodiments of the present application.

As shown in FIG. 8, the gNB 80 indicates the number of transmission beams 800 of the gNB for the BS-repeater link is 4, e.g., #1-#4, and the number of repeater transmission beam 812 for the repeater-U link is three, e.g., #a, #b and #c. These numbers can be configured based on the corresponding beam numbers reported by the repeater 81. In addition, the repeater 81 has two reception beams 810 for the BS-repeater, e.g., #A and #B.

In step 1, a first set of RS, e.g., a first set of CSI-RS is transmitted to the repeater 81 via a first DL signal, which will be received by the repeater 81. The gNB 80 may also indicate the number of gNB transmission beam 800 for the BS-repeater link, or the number of RS in the first RS set, or both the two numbers. The repeater 81 will measure the first set of RS, and then report to the gNB 80 to determine a first repeater DL reception beam, e.g., beam #3 for gNB transmission beam. Meanwhile, using beam #A has higher RSRP than using beam #B, so the repeater 81 can also determine that the best reception beam at the repeater 81 for gNB-repeater link is beam #B. Then, in step 2, a second set of RS, e.g., a second set of CSI-RS is transmitted from the gNB 80 via a second DL signal, which will be received and forwarded by repeater 81 to the UE 82. The gNB 80 may also indicate the repeater 81 a value corresponding to the number of DL transmission beams at the repeater side for the repeater-UE link, e.g., 3 repeater transmission beam, or a number of RS in second RS set configured to the UE 82, which is also based on the value, or both the value and the number of RS in the second RS set. For this second set of RS, the gNB 80 will also indicate beam #3 to the repeater 81 to determine the reception beam #A at the repeater side. The value is for the repeater 81 to determine the number of transmission beams at repeater side for the repeater-UE link. The UE 82 will receive the second set of RS, measure and report to the gNB 80 via the repeater 81. Accordingly, with the UE reported RS index, the gNB 80 can determine the QCL-typeD RS, i.e., beam for the repeater-UE link.

In addition to Scheme 1 and Scheme 2, embodiments of the present application also provide other schemes of beam determination. For example, according to some embodiments of the present application, determining at least one spatial domain filter associated with at least one RS may include: determining at least one first spatial domain filter for the BS-repeater link based on a signaling from the second RAN node, which indicates a spatial domain filter for the reception or transmission for the BS-repeater link in the repeater side; and determining at least one second spatial domain filter for the repeater-UE link based on the second number, or the number of RSs in the set of RSs received by the repeater and transmitted to the UE, or both the second number and the number of RSs in the set of RSs. That is, for step 1 in Scheme 2, the beam for the BS-repeater link at the repeater side can be indicated by a signal, and the first set of RS for channel measurement and report etc., is not required.

Besides the methods, embodiments of the present application also propose an apparatus of beam indication.

Figure 9:
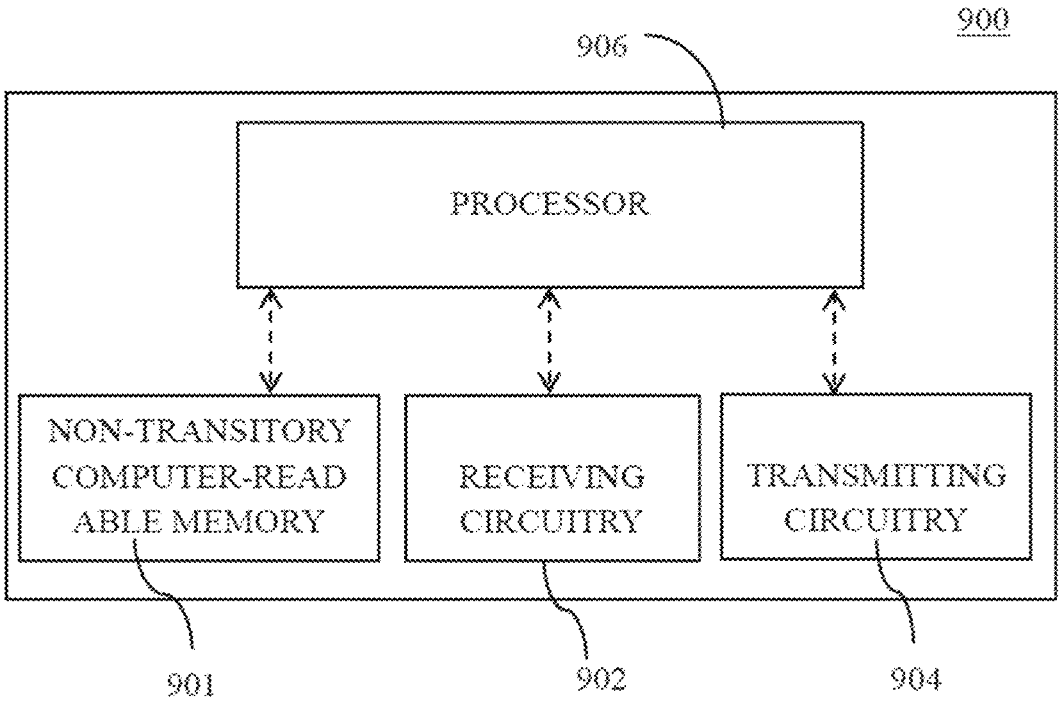
FIG. 9 illustrates a block diagram of an exemplary apparatus of measurement and reporting for beam determination according to some embodiments of the present application.

For example, FIG. 9 illustrates a block diagram of an apparatus of measurement and reporting for beam determination 900 according to some embodiments of the present application.

As shown in FIG. 9, the apparatus 900 may include at least one non-transitory computer-readable medium 901, at least one receiving circuitry 902, at least one transmitting circuitry 904, and at least one processor 906 coupled to the non-transitory computer-readable medium 901, the receiving circuitry 902 and the transmitting circuitry 904. The at least one processor 906 may be a CPU, a DSP, a microprocessor etc. The apparatus 900 may be a RAN node, e.g., a gNB or a repeater configured to perform a method illustrated in the above or the like.

Although in this figure, elements such as the at least one processor 906, transmitting circuitry 904, and receiving circuitry 902 are described in the singular, the plural is contemplated unless a limitation to the singular is explicitly stated. In some embodiments of the present application, the receiving circuitry 902 and the transmitting circuitry 904 can be combined into a single device, such as a transceiver. In certain embodiments of the present application, the apparatus 900 may further include an input device, a memory, and/or other components.

In some embodiments of the present application, the non-transitory computer-readable medium 901 may have stored thereon computer-executable instructions to cause a processor to implement the method with respect to the first RAN node as described above. For example, the computer-executable instructions, when executed, cause the processor 906 interacting with receiving circuitry 902 and transmitting circuitry 904, so as to perform the steps with respect to the first RAN node as depicted above.

In some embodiments of the present application, the non-transitory computer-readable medium 901 may have stored thereon computer-executable instructions to cause a processor to implement the method with respect to the second RAN node as described above. For example, the computer-executable instructions, when executed, cause the processor 906 interacting with receiving circuitry 902 and transmitting circuitry 904, so as to perform the steps with respect to the second RAN node as illustrated above.

Figure 10:
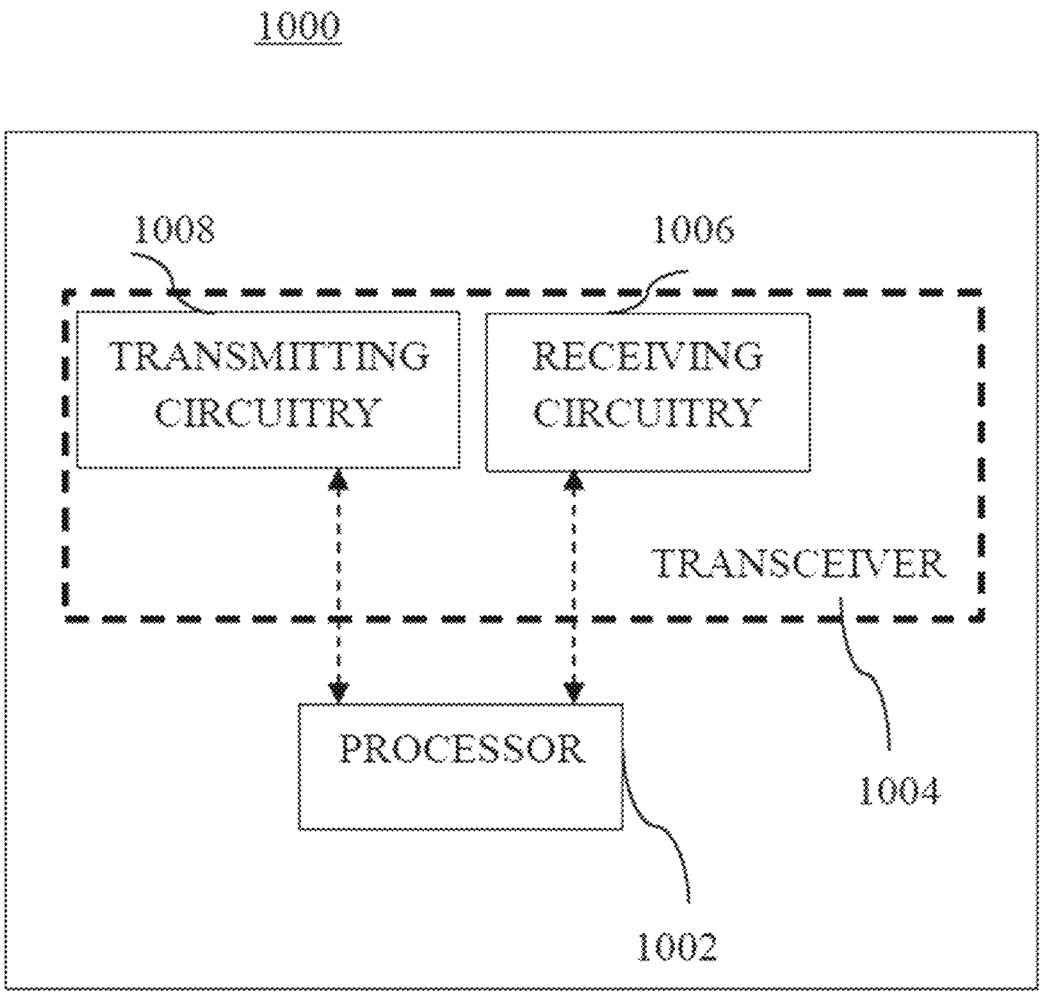
FIG. 10 illustrates a block diagram of an exemplary apparatus of measurement and reporting for beam determination according to some other embodiments of the present application.

FIG. 10 is a block diagram of an apparatus of measurement and reporting for beam determination 1000 according to some other embodiments of the present application.

Referring to FIG. 10, the apparatus 1000, for example a gNB or a repeater may include at least one processor 1002 and at least one transceiver 1004 coupled to the at least one processor 1002. The transceiver 1004 may include at least one separate receiving circuitry 1006 and transmitting circuitry 1004, or at least one integrated receiving circuitry 106 and transmitting circuitry 1004. The at least one processor 1002 may be a CPU, a DSP, a microprocessor etc.

According to some embodiments of the present application, when the apparatus 1000 is a first RAN node, e.g., a repeater, the processor is configured to: receive, via the transceiver, first information indicating one or more sets of RS from a second RAN node; receive, via the transceiver, second information indicating at least one of the following from the second RAN node: a) a first number of first spatial domain filter for a link between the second RAN node and the RAN node, and a second number of second spatial domain filter for a link between the RAN node and a third node; b) the second number; or c) a third number based on the first number and the second number; and determine at least one spatial domain filter associated with at least one RS of the one or more sets of RS at least based on the second information, wherein the at least one spatial domain filter includes at least one of: the first spatial domain filter for the link between the second RAN node and the RAN node or the second spatial domain filter for the link between the RAN node and the third node.

According to some other embodiments of the present application, when the apparatus 1000 is a second RAN node, e.g., gNB, the processor may be configured to: transmit, via the transceiver, first information indicating one or more sets of RS to a first RAN node; transmit, via the transceiver, second information indicating at least one of the following to the first RAN node: a) a first number of first spatial domain filter for a link between the RAN node and the first RAN node, and a second number of second spatial domain filter for a link between the first RAN node and a third node; b) the second number; or c) a third number based on the first number and the second number; and determine at least one spatial domain filter associated with at least one RS of the one or more sets of RS at least based on the second information, wherein the at least one spatial domain filter includes at least one of: the first spatial domain filter for the link between the RAN node and the first RAN node or the second spatial domain filter for the link between the first RAN node and the third node.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device capable of implementing the flowcharts shown in the figures may be used to implement the processor functions of this application. For example, an embodiment of the present application provides an apparatus, including a processor and a memory. Computer programmable instructions for implementing a method are stored in the memory, and the processor is configured to perform the computer programmable instructions to implement the method. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method as stated above or other method according to an embodiment of the present application.

In addition, in this disclosure, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The terms "having," and the like, as used herein, are defined as "including."

What is claimed:

1. A first radio access network (RAN) node, comprising:
- at least one memory; and
- at least one processor coupled with the at least one memory and configured to cause the first RAN node to:
  - receive, from a second RAN node, first information indicating one or more sets of reference signal (RS);
  - receive, from the second RAN node, second information indicating at least one of:
    - a first number of one or more first spatial domain filters for a link between the second RAN node and the first RAN node, and a second number of one or more second spatial domain filters for a link between the first RAN node and a third node;
    - the second number of one or more second spatial domain filters for a link between the first RAN node and the third node; or
    - a third number based on the first number and the second number; and
  - determine at least one spatial domain filter associated with at least one RS of the one or more sets of RS based at least in part on the second information, wherein the at least one spatial domain filter includes at least one of: the one or more first spatial domain filters for the link between the second RAN node and the first RAN node or the one or more second spatial domain filters for the link between the first RAN node and the third node.

2. The first RAN node of claim 1, wherein the one or more sets of RS comprise one or more of a set of RS to be received by the first RAN node and transmitted from the first RAN node to the third node, or a set of RS to be received by the first RAN node and transmitted from the first RAN node to the second RAN node.

3. The first RAN node of claim 2, wherein to determine the at least one spatial domain filter associated with the at least one RS, the at least one processor is configured to cause the first RAN node to:
- map the at least one spatial domain filter with the at least one RS of the set of RS in a mapping order based on at least one of: the first number, the second number, a number of one or more spatial domain filters for transmission in the second RAN node, or a number of RSs in the set of RS, wherein the mapping order is predefined or is configured by the second RAN node; or
- map the at least one spatial domain filter with the at least one RS of the set of RS in the mapping order based on at least one of: the third number, a number of one or more spatial domain filters for transmission in the second RAN node, or a number of RSs in the set of RS.

4. The first RAN node of claim 3, wherein the mapping order comprises a sequence of at least one of: mapping between RSs to spatial domain filters for the link between the second RAN node and the first RAN node, or mapping between RSs and spatial domain filters for the link between the first RAN node and the third node.

5. The first RAN node of claim 3, wherein the mapping order comprises a sequence of at least one of: mapping between RSs to spatial domain filters for the second RAN node, mapping between RSs to spatial domain filters for the first RAN node, or mapping between RSs and spatial domain filters for the third node.

6. The first RAN node of claim 2, wherein the set of RS comprises one or more of a set of channel state information-reference signal (CSI-RS), a set of synchronization signal (SS)/physical broadcast channel (PBCH) block (SSB), or a set of sounding reference signal (SRS).

7. The first RAN of claim 1, wherein the one or more sets of RS comprise a first set of RS and a second set of RS separately received via the first information, and the second set of RS is to be received by the first RAN node and transmitted to the third node by the first RAN node.

8. The first RAN node of claim 7, wherein to determine the at least one spatial domain filter associated with the at least one RS, the at least one processor is configured to cause the first RAN node to:
- determine at least one first spatial domain filter associated with at least one RS of the first set of RS based on at least one of: a number of one or more spatial domain filters for transmission in the second RAN node, or a number of RSs in the first set of RSs; and
- determine at least one second spatial domain filter associated with at least one RS of the second set of RS based on at least one of: the second number of one or more spatial domain filters, or a number of RSs in the second set of RSs.

9. The first RAN node of claim 7, wherein both the first set of RS and the second set of RS comprise a set of channel state information-reference signal (CSI-RS), or a set of synchronization signal (SS)/physical broadcast channel (PBCH) block (SSB).

10. The first RAN node of claim 9, wherein based at least in part on the first set of RS and the second set of RS comprise SSB, the first set of RS and the second set of RS configured based on one or more of different SSB indexes, different SSB offsets, or different SSB periodicities and offsets.

11. The first RAN node of claim 1, wherein to determine the at least one spatial domain filter associated with the at least one RS, the at least one processor is configured to cause the first RAN node to:

determine at least one first spatial domain filter for the link between the first RAN node and the second RAN node based at least in part on a signaling from the second RAN node indicating a spatial domain filter; and determine at least one second spatial domain filter for the link between the first RAN node and the third node based at least in part on at least one of: the second number of one or more second spatial domain filters for the link between the first RAN node and the third node, or a number of RSs in a set of RS to be received by the first RAN node and transmitted to the third node.

12. The first RAN node of claim 1, wherein the at least one processor is configured to cause the first RAN node to transmit to the second RAN node at least one of the first number of one or more first spatial domain filter filters for the link between the second RAN node and the first RAN node, the second number of one or more second spatial domain filters for the link between the first RAN node and the third node, or the third number based on the first number and the second number.

13. The first RAN node of claim 1. wherein the at least one processor is configured to cause the first RAN node to receive a number of spatial domain filter for transmission or reception in the second RAN node.

14. A second radio access network (RAN) node, comprising:

at least one memory; and at least one processor coupled with the at least one memory and configured to cause the second RAN node to:

transmit, to a first RAN node, first information indicating one or more sets of reference signal (RS);

transmit, to the first RAN node, second information indicating at least one of:

a first number of one or more first spatial domain filters for a link between the second RAN node and the first RAN node, and a second number of one or more second spatial domain filters for a link between the first RAN node and a third node;

the second number of one or more second spatial domain filters for a link between the first RAN node and a third node; or a third number based on the first number and the second number; and determine at least one spatial domain filter associated with at least one RS of the one or more sets of RS based at least in part on the second information, wherein the at least one spatial domain filter includes at least one of: the one or more first spatial domain filter for the link between the second RAN node and the first RAN node or the one or more second spatial domain filters for the link between the first RAN node and the third node.

15. A method performed at a first radio access network (RAN) node, comprising:

receiving, from a second RAN node, first information indicating one or more sets of reference signal (RS);

receiving, from the second RAN node, second information indicating at least one of:

a first number of one or more first spatial domain filters for a link between the second RAN node and the first RAN node, and a second number of one or more second spatial domain filters for a link between the first RAN node and a third node;

the second number of one or more second spatial domain filters for a link between the first RAN node and the third node; or a third number based on the first number and the second number; and determining at least one spatial domain filter associated with at least one RS of the one or more sets of RS based at least in part on the second information, wherein the at least one spatial domain filter includes at least one of: the one or more first spatial domain filters for the link between the second RAN node and the first RAN node or the one or more second spatial domain filters for the link between the first RAN node and the third node.

16. A processor for wireless communication, comprising:

at least one controller coupled with at least one memory and configured to cause the processor to:

receive, at a first RAN node from a second RAN node, first information indicating one or more sets of reference signal (RS);

receive, from the second RAN node, second information indicating at least one of:

a first number of one or more first spatial domain filters for a link between the second RAN node and the first RAN node, and a second number of one or more second spatial domain filters for a link between the first RAN node and a third node;

the second number of one or more second spatial domain filters for a link between the first RAN node and the third node; or a third number based on the first number and the second number; and determine at least one spatial domain filter associated with at least one RS of the one or more sets of RS and based at least in part on the second information, wherein the at least one spatial domain filter includes at least one of: the one or more first spatial domain filters for the link between the second RAN node and the first RAN node or the one or more second spatial domain filters for the link between the first RAN node and the third node.

17. The processor of claim 16, wherein the one or more sets of RS comprise one or more of a set of RS to be received by the first RAN node and transmitted from the first RAN node to the third node, or a set of RS to be received by the first RAN node and transmitted from the first RAN node to the second RAN node.

18. The processor of claim 17, wherein to determine the at least one spatial domain filter associated with the at least one RS, the at least one controller is configured to cause the processor to:

map the at least one spatial domain filter with the at least one RS of the set of RS in a mapping order based on at least one of: the first number, the second number, a number of one or more spatial domain filters for transmission in the second RAN node, or a number of RSs in the set of RS, wherein the mapping order is predefined or is configured by the second RAN node; or map the at least one spatial domain filter with the at least one RS of the set of RS in the mapping order based on at least one of: the third number, a number of one or more spatial domain filters for transmission in the second RAN node, or a number of RSs in the set of RS.

19. The processor of claim 18, wherein the mapping order comprises a sequence of at least one of: mapping between RSs to spatial domain filters for the link between the second RAN node and the first RAN node, or mapping between RSs and spatial domain filters for the link between the first RAN node and the third node.

20. The processor of claim 18, wherein the mapping order comprises a sequence of at least one of: mapping between RSs to spatial domain filters for the second RAN node, mapping between RSs to spatial domain filters for the first RAN node, or mapping between RSs and spatial domain filters for the third node.

* * * * *